United States Patent [19]

Hobbs et al.

[11] 3,928,405
[45] Dec. 23, 1975

[54] METHODS OF MANUFACTURING HEAVY METAL TRINITRO RESORCINATE

[75] Inventors: John Francis Hobbs, Sutton Coldfield; William Melville, Birmingham, both of England

[73] Assignee: Imperial Metal Industries (Kynoch) Limited, Birmingham, England

[22] Filed: Oct. 26, 1973

[21] Appl. No.: 410,092

[30] Foreign Application Priority Data

Nov. 9, 1972  United Kingdom............... 51680/72

[52] U.S. Cl............................ 260/435 A; 260/430
[51] Int. Cl.$^2$........................................... C07F 7/24
[58] Field of Search...................... 260/435 A, 430

[56] References Cited
UNITED STATES PATENTS

| | | | |
|---|---|---|---|
| 1,942,274 | 2/1934 | Brün | 260/435 A X |
| 1,999,728 | 4/1935 | Herz | 260/435 A |
| 2,150,653 | 3/1939 | Franz et al. | 260/435 A |
| 2,927,845 | 3/1960 | Plunkett | 23/285 |
| 3,431,312 | 3/1969 | Toischer et al. | 23/266 X |
| 3,770,721 | 11/1973 | Robbins et al. | 23/266 X |

FOREIGN PATENTS OR APPLICATIONS

| | | |
|---|---|---|
| 359,659 | 10/1931 | United Kingdom |
| 500,711 | 2/1939 | United Kingdom |

OTHER PUBLICATIONS

Chemical Abstracts, Vol. 47, 10852f, (1953).
Chemical Abstracts, Vol. 26, 848$^7$ (1932).
Chemical Abstracts, Vol. 32, 357$^9$ (1938).
Chemical Abstracts, Vol. 20, 3571$^1$ (1926).

*Primary Examiner*—Helen M. S. Sneed
*Attorney, Agent, or Firm*—Cushman, Darby & Cushman

[57] ABSTRACT

A method of manufacturing a heavy metal azide or a heavy metal trinitro resorcinate by a continuous process in which solutions of the constituents are reacted in an agitated reaction vessel and are then passed through a series of chambers also provided with agitation. Preferably the reaction vessel surface has a low roughness, a high hardness, and the rate of manufacture of the azide or styphnate is controlled.

20 Claims, 3 Drawing Figures

METHODS OF MANUFACTURING HEAVY METAL TRINITRO RESORCINATE

FIELD OF THE INVENTION

This invention relates to methods of manufacturing a heavy metal azide or styphnate. The invention is particularly concerned with the manufacture of lead styphnate crystals which are commonly used in the manufacture of ammunition priming compositions, and are also used in other explosive compositions, for example detonators.

BACKGROUND OF THE INVENTION

Various methods have been proposed and are used for the manufacture of lead styphnate crystals. These usually consist of a batch process in which equivalent quantities of solutions of sodium or magnesium trinitro resorcinate and lead nitrate are run into a reaction vessel. The resulting mixture is maintained at the desirable operating temperature and stirred, and reaction takes place between the constituents to produce the compound lead trinitro resorcinate which is initially amorphous, and then crystallises. This compound is commonly referred to as lead styphnate. It is apparent that a finite time is taken within which to flow the solutions into the reaction vessel such that reaction has already commenced whilst the solutions are still being admitted to the vessel. As a result, some crystals of lead styphnate are produced at an early stage in the mixing and they then become nuclei for the growth of large crystals from the addition of further quantities of the solutions. When the required quantities of the solutions have been mixed together, a further passage of time elapses before the crystals have been formed to such a degree as to give an adequate yield from the constituents, and the resulting product is a mass of crystals which have a large variation in size.

Ideally, it is desirable that the crystals have approximately the same size and that that size should be controllable to enable the crystals to have physical dimensions which will suit the way in which they are to be subsequently mixed with other constituents of a priming composition. Frequently, as in rimfire cartridges, the priming composition must be capable of being pressed into a narrow recess.

The prior process to which reference is made also suffers from the disadvantage that large quantities of lead styphnate crystals are located together. This can be hazardous in that any accidental explosion is thereby magnified.

In addition, it will be appreciated that the use of a batch process in this case, as is normally so, suffers from the low economic utilisation of the plant and personnel concerned.

There has been proposed a method of continuously forming lead styphnate crystals but this has also been found to be disadvantageous in that the crystal-forming double decomposition takes place in a single vessel and the time required for this reaction to be completed and for the crystals to grow to the required size again means that a large quantity of lead styphnate is located within that single vessel.

Also, by use of a single vessel continuous process some crystals may escape before they are properly formed; others may remain for a long period. The aforementioned size variation will therefore still apply or even be accentuated.

The commercial manufacture of lead styphnate was instituted about fifty years ago, and ever since that time there has been encountered a further problem in the build-up of crystals on the walls of the vessel in which the lead styphnate is made. It is believed that in the early days wooden vessels were used, followed by earthenware, copper and now nickel plated or stainless steel vessels. However, the crystals still accumulate to form a dangerous deposit which must be removed periodically. For a continuous process of styphnate manufacture, this is clearly a major disadvantage. This is also true in azide manufacture.

SUMMARY OF THE INVENTION

In accordance with the present invention, a method of manufacturing a heavy metal azide or a heavy metal styphnate comprises continuously flowing solutions of alkali azide and a heavy metal salt, or solutions of a trinitro resorcinate and a heavy metal salt into a reaction vessel, continuously agitating the contents of the reaction vessel, flowing the contents of the reaction vessel through a series of chambers to an outlet, and continuously agitating the contents of said chambers.

Preferably the heavy metal salt is a soluble lead or silver salt.

Preferably also the contents of the reaction vessel and the chambers are continuously agitated by respective streams of gas which may be saturated by water vapour.

Preferably further the reaction vessel and at least one of the chambers are maintained at a temperature of 45°–70°C, preferably 60°–70°C.

The reaction vessel and at least one of the chambers may be maintained at a temperature of 45°–70°C by a surrounding water bath, or by heating of the gas streams referred to above.

The present invention also consists in a method of manufacturing a heavy metal azide or a heavy metal styphnate comprising continuously flowing solutions of alkali azide and a heavy metal salt, or solutions of a trinitro resorcinate and a heavy metal salt, into a reaction vessel at a rate not greater than 0.04 gram of resulting azide or styphnate per minute per square centimetre surface area of the reaction vessel, the surface of the reaction vessel being resistant to chemical attack, having a surface roughness of less than 0.025 micron and having a hardness of at least 5 MOH.

Preferably the solutions are continuously agitated in the reaction vessel, for example by a stream of gas or by a mechanical device such as a paddle for example.

Preferably also the reaction vessel is formed of or lined with a glass, preferably a boro-silicate glass.

Preferably further said rate is not greater than 0.025 gram per minute per square centimetre.

Preferably further the surface roughness is not greater than 0.0025 micron.

BRIEF DESCRIPTION OF THE DRAWINGS

Typical examples of the present invention will now be described with reference to the accompanying drawings in which.

DESCRIPTION OF THE PREFERRED EMBODIMENTS

Figure 1:
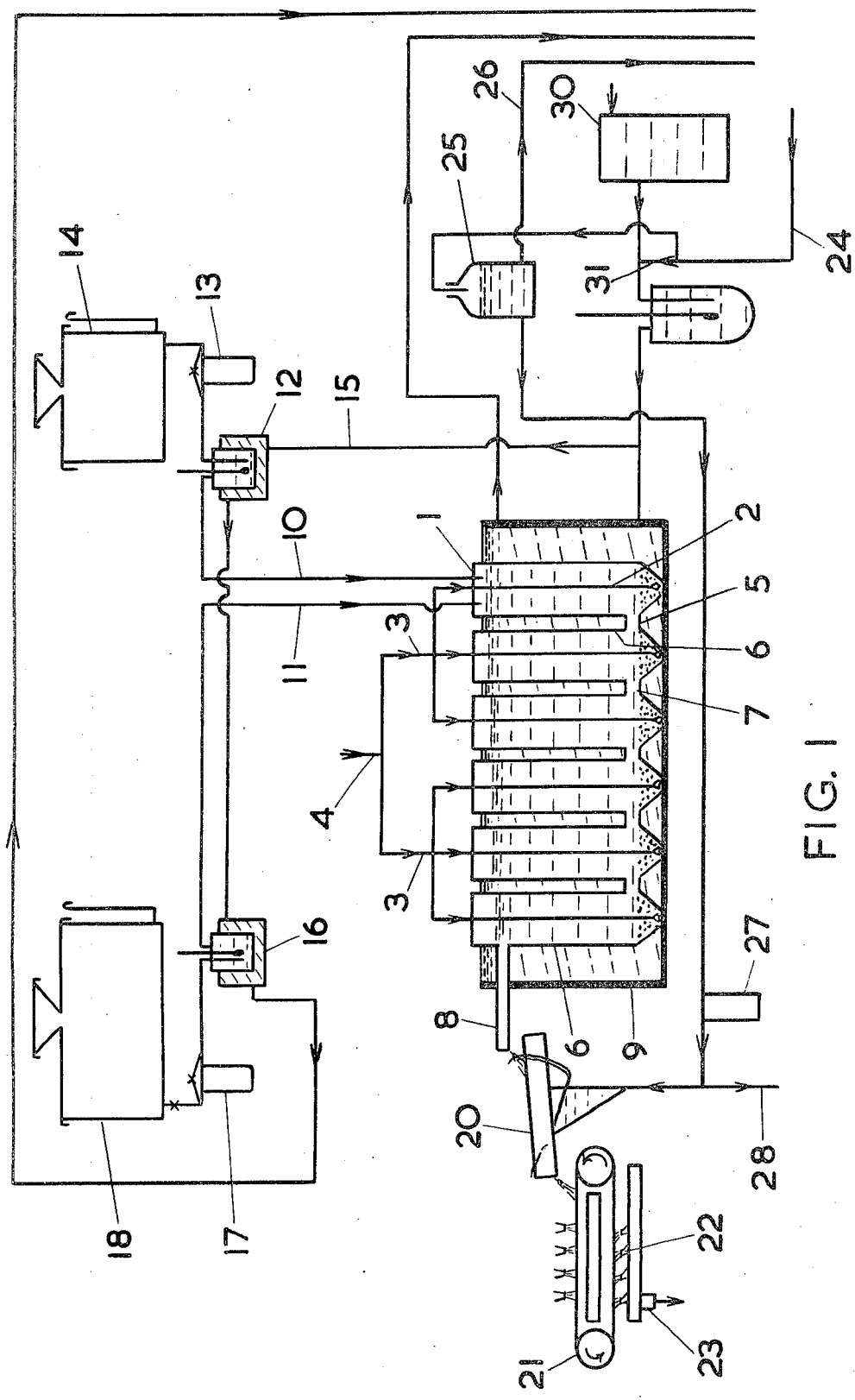
FIG. 1 is a diagrammatic flowsheet of the first example of the invention.

In the first typical example to which FIG. 1 refers, there is utilised a reaction vessel 1 which can be cylindrical or rectangular in cross-section, and terminates at its lower end in a tapering section. The reaction vessel 1 has an effective surface area of about 320 square centimetres. Located at the bottom of the vessel is an outlet 2 for compressed air provided through a manifold system 3 from a source indicated by 4. Located immediately above the tapering section of the reaction vessel 1 is an outlet 5 which leads to a series of chambers 6. Each chamber 6 is identical to the reaction vessel 1 and the chambers 6 are all linked together by outlets 7 to form a complete series through which can flow any liquids placed in the reaction vessel 1. Each chamber 6 is also provided with an air agitation system identical to the air outlet 2 of the reaction vessel 1, the air being supplied through the manifold system 3 mentioned above. The last chamber 6 terminates in a final outlet 8 located just below its top.

The reaction vessel 1 and chambers 6 are made of a boro-silicate glass having a very low coefficient of thermal expansion, eg made of "Pyrex" (Registered Trade Mark). The glass has a surface roughness of less than 0.025 micron which is about 0.0025 micron. This is measured on the Centre Line Average system in which the profile of the surface is examined and there is measured its average arithmetical departure to each side of the mean level. The glass also has a hardness of at least 5 on the MOH scale on which talc has a value of 1 and diamond a value of 10. The glass is 5.5 MOH.

The reaction vessel 1 and the series of chambers 6 are all enclosed within a water bath 9 which maintains the vessel and chambers at the desired operating temperature of 45°–70°C, preferably 60°–70°C.

The reaction vessel 1 is provided with two inlet pipes 10, 11 of which the pipe 10 is connected through a heat exchanger 12 and a flowmeter and bypass unit 13 to a storage tank 14 which contains a solution of a suitable trinitro resorcinate. Magnesium trinitro resorcinate is preferred. The heat exchanger 12 is coupled by tubing 15 to the water circulation system of the water bath 9 to heat the solution from the tank 14 en route for the reaction vessel 1 to the temperature of the water bath.

Similarly, the inlet pipe 11 is connected by tubing to a heat exchanger 16 and thence via a flowmeter and by-pass unit 17 to a storage tank 18. The storage tank 18 contains a solution of lead nitrate. The heat exchanger 16 is supplied with water from the heat exchanger 12 to again increase the temperature of the lead nitrate solution as it passes therethrough en route for the reaction vessel.

The final outlet 8 leads to an inclined grader vessel 20 in which any unduly large crystals of lead styphnate are removed, and thence to a continuously running endless belt system 21 upon which the crystals are washed and finally removed by water sprays 22 to be delivered as a slurry through outlet 23.

The inclined grader vessel 20 is provided with a constant flow of cold water through piping 24 and a constant head device 25 from which surplus water is drained through piping 26. From the constant head device 25 the cold water flows through a flowmeter 27 into the bottom of the inclined grader vessel 20 at monitored rate of flow such that crystals which are too large can descend against the flow of water to the outlet 28 but smaller crystals will continue their passage to the endless belt system 21.

The drawing also shows a water heater 30 for supplying heated water to the water bath 9 and also the heat exchangers 12 and 16. Cold water is supplied to the hot water via inlet 31 as required to produce the desired temperatures in the water bath 9 and the heat exchangers 12, 16.

In operation, the solutions of magnesium trinitro resorcinate and lead nitrate are permitted to flow from the storage tanks 14 and 18 respectively via the flowmeters 13 and 17 and the heat exchangers 12 and 16 to the inlet pipes 10 and 11. From these, the solutions run into the reaction vessel 1 and are continuously mixed together and agitated by the air bubble flow from the outlet 2. The concentrations of the solutions and their rate of flow is such that there can be formed 8.5 grams of lead styphnate per minute. The level of the contents of the reaction vessel 1 is controlled by operation of the flowmeters 13 and 17 to be just above the level of the final outlet 8 so that there is a hydrostatic head through the series of chambers 6. As a result, the contents of the reaction vessel 1 gradually percolate through each of the outlets 5 first from the reaction vessel 1 to the first of the series of chambers 6 and thence through all of the chambers 6 to the final outlet 8.

The rate of flow and the degree of air agitation, particularly in the reaction vessel 1, are arranged so that the double decomposition reaction which takes place in the reaction vessel 1 between the magnesium trinitro resorcinate and the lead nitrate is substantially complete whilst the solutions are in the reaction vessel 1. The initial product is an amorphous jelly-like substance which then passes gradually and with air agitation through the series of chamber 6. Whilst in those chambers, the amorphous material gradually crystallises and the fine crystals grow in size until all of the amorphous material is exhausted. During the formation of the crystals, they are physically removed from inflow of the original solutions in that they do not normally appear until they have left the reaction vessel 1 so that the crystals will not grow rapidly by the direct incidence upon them of those solutions.

Clearly the apparatus described and the method of using it are capable of fine control to produce the crystal sizes that are desired.

It will also be appreciated that the reaction vessel 1 and the chamber 6 physically split the lead styphnate crystals into discrete volumes so that the danger of serious explosion is greatly minimised.

It will also be appreciated that the air agitation provided in the reaction vessel 1 provides for thorough mixing of the two solutions entering through the inlets 10 and 11. The air agitation is repeated in each of the series of chambers 6 to again ensure that as homogeneous a mixture as is possible is formed, to give the forming crystals equal opportunity to grow from the amorphous reaction product formed in the reaction vessel 1. The air agitation in each of the chambers 6 also minimises the chance of the amorphous material passing straight through the chambers 6 to the outlet 8 and thereby being removed without having an opportunity to crystallise. There are also avoided the dangers that some crystals will be given a fresh supply of amorphous material or even unreacted solutions, to enable them to grow to an abnormally large size.

It is also found that the crystals of lead styphnate that do form are not deposited on the glass wall of the reaction vessel. This is an effect which is very beneficial to a continuous process for producing azides and styphnates, and is heavily dependent upon the rate of manufacture thereof. Thus we have found that there is a correlation between the rate of manufacture as expressed against time and against surface area in contact with the solutions in the reaction vessel. In this first example lead styphnate is being produced at the rate of 0.025 gram per minute per square centimetre of surface area. The production rate can be increased up to 0.04 gram per minute per square centimetre, but above this deposition occurs at a rapid rate. Thus a comparative experiment at the rate of 0.06 gram per minute per square centimetre produced rapid crystal deposition.

The nature of the surface of the reaction vessel is also important. Thus with a lead styphnate production rate of less than 0.025 gram per minute per square centimetre of the reaction vessel, there were hung in its samples of the following: nylon rod, polythene rod, Tufnol rod, aluminium strip coated with silicone resin, aluminum strip coated with fluon, polythene sheet, Perspex sheet, phenol formaldehyde strip, polypropylene sheet, PVC sheet, glass rod, fluon rod, stainless steel sheet polished, stainless steel sheet matt surface. After 8 hours in such conditions the only material which did not have lead styphnate crystals adherent thereto was the one material with a surface roughness of less than 0.025 micron, ie the glass rod. In comparison, stainless steel polished sheet has a surface roughness of about 0.1 micron. Other forms of glass have since been shown to be satisfactory, ie sheet and tubular glass of soda-glass and boro-silicate glass, all conforming to this level of roughness. The surface finish must also remain during use, and withstand the scratching effect of the crystals themselves. The surface must therfore be resistant to chemical attack and be sufficiently hard, ie have a hardness of at least 5 MOH.

As the lead styphnate crystals leave the series of chambers 6 through the final outlet 8, the inclined grader vessel 20 operates as described above to remove any excessively large crystals which may have formed. The crystals are washed and removed as a slurry through outlet 23.

Figure 2:
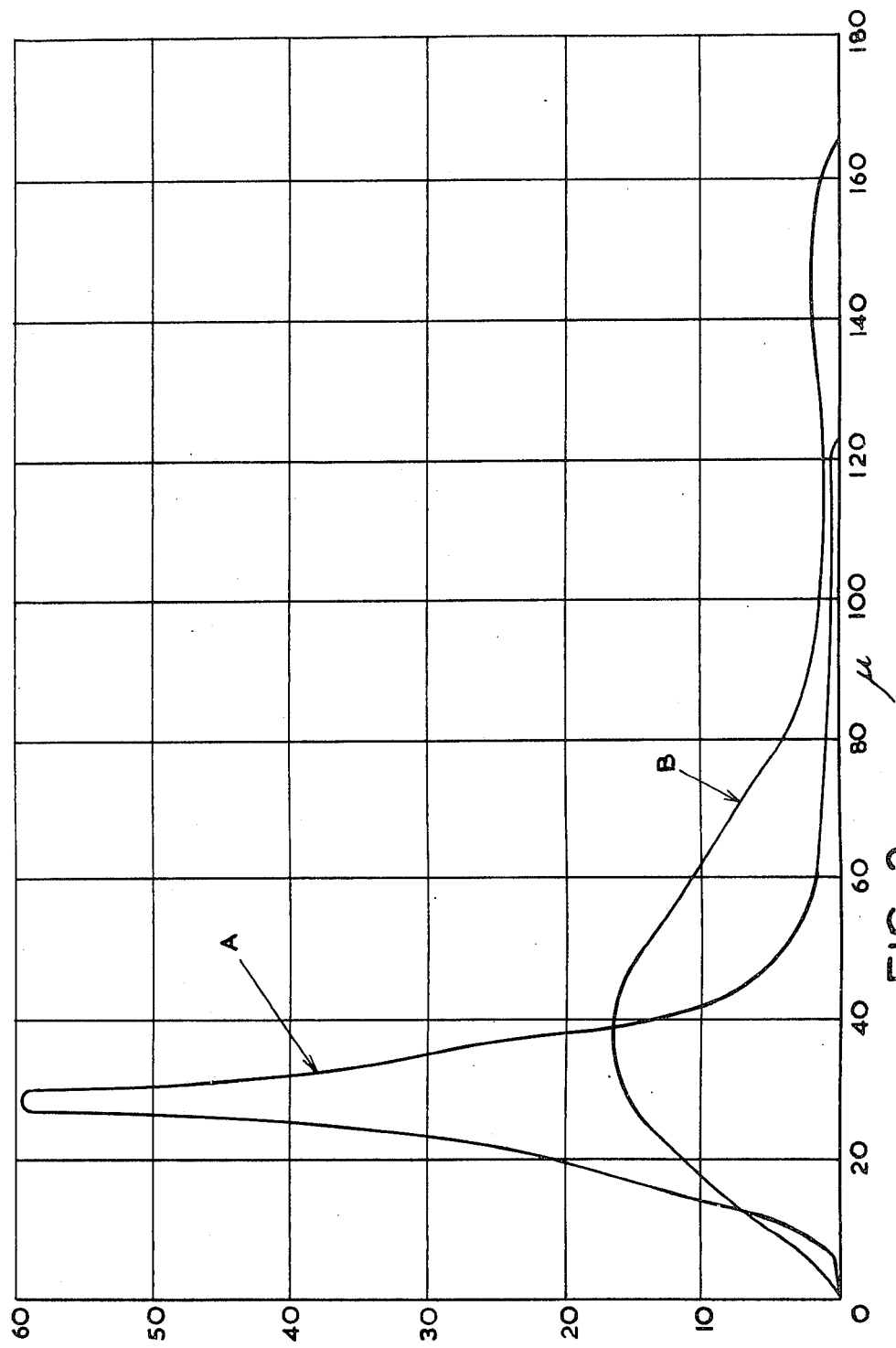
FIG. 2 is a graph showing crystal sizes produced using the process shown in FIG. 1 in comparison with the prior art.

Reference is also made to FIG. 2 of the drawings which is a graph which shows in histogram form a size distribution of a Sample A of lead styphnate crystals produced using the equipment described above. Thus for each particle size in microns the corresponding level on the vertical axis gives a relative weight of the crystals which have that micron size. As an example the Sample A crystals of size 30 microns have a relative weight of 60 units compared with 4 units at 10 microns and 4 units at 50 microns. This is compared with size distribution of a Sample B of lead styphnate crystals arising from the batch process mentioned in the preamble of this specification. Extending the example just given on Sample A crystals, the Sample B crystals of size 30 microns have a relative weight of only 15 units compared with 7 units at 10 microns and 15 units at 50 microns. The Sample B crystals also extend up to 166 microns instead of 124 microns for Sample A, and have twice the weight of 160 micron crystals as crystals of 100 and 120 microns of Sample A. The improvement of the present invention is readily apparent.

Figure 3:
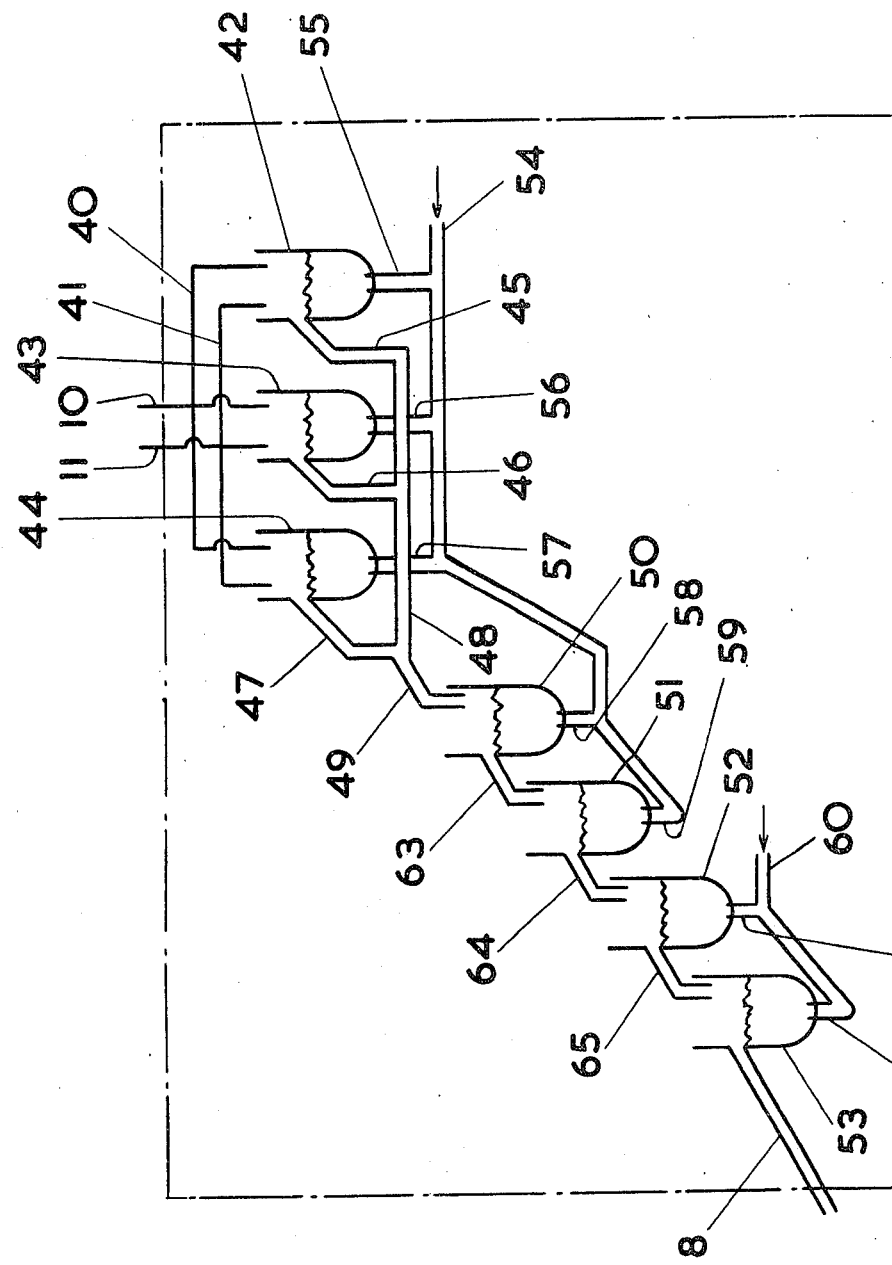
FIG. 3 shows a modification of part of FIG. 1 used in a second example of the invention.

Reference is now made to FIG. 3 of the drawings which shows a cascade system replacing the water-bath 9 of FIG. 1 to form a second typical example of the invention.

FIG. 3 shows the inlet pipes 10, 11 of the first example which are branched at 40, 41 to form three outlets for each pipe, each pair of outlets leading into a corresponding one of three reaction vessels 42, 43, 44 of borosilicate glass with the same smoothness and hardness as Example 1. The amorphous lead styphnate product is formed in these reaction vessels, which are provided in triplicate to treble the production of crystals of lead styphnate without deposit on the chamber wall, ie to produce 25 grams of lead styphnate per minute at 0.025 gram per minute per square centimetre.

The reaction vessels 42, 43, 44 are provided with respective overflow outlets 45, 46, 47 leading either into a collector tube 48, or into a collector vessel, and thence through an overflow 49 into a cascade series of chambers similar to the reaction vessel 42, 43, 44. The drawing shows four such chambers denoted 50–53.

In the first example the reaction vessel and each chamber were agitated by respective supplies of air, and were also heated by the water bath 9. In the second example these operations are combined in that there is provided through a pipe 54 a supply of air which is at such a temperature that it will maintain the required temperature and is saturated with water vapour to prevent heat loss by evaporation. Thus the pipe 54 feeds ducts 55, 56, 57 leading into the bases of the reaction vessels 42, 43, 44 respectively. The pipe 54 also supplies all of the chambers except the last two, such that in this example the pipe 54 feeds ducts 58, 59 leading to chambers 50, 51. The last two chambers 52, 53 are provided with a supply of cold saturated air through a pipe 60 and ducts 61, 62.

The cascade series of chambers 50-53 receive solution containing lead styphnate from the overflow 49, and pass it on through overflows 63, 64 65 to the last chamber 53 from which the overflow 8 is the same as the overflow 8 of the first example, and leads to the remainder of the apparatus. The chambers 50–53 divide the lead styphnate into discrete volumes to confine any explosion to the lead styphnate in the chamber in which the explosion occurs. The crystals are also able to grow in uniform and controllable conditions to provide the required size control.

In a modification of the examples the gravity flow of the constituent solutions from the storage tanks 14 and 18 is replaced by forced flow. In this case the flowmeters 13 and 17 are replaced by metering pumps, and flow indicators may be provided if required.

We claim:

1. A method of manufacturing lead styphnate comprising continuously flowing solutions of a trinitro resorcinate and a lead salt into a reaction vessel, continuously agitating the contents of the reaction vessel, flowing the contents of the reaction vessel through a plurality of chambers wherein the reaction vessel and at least one of said plurality of chambers are maintained at a temperature of 45° to 70°C, and wherein said reaction vessel is connected in series with said chambers, to an outlet from which lead trinitro resorcinate and remaining solution is continuously drawn off, and within each chamber continuously agitating the contents of that chamber.

2. A method as claimed in claim 1 wherein the solutions of trinitro resorcinate and lead are fed into the reaction vessel at a rate such as to produce not more than 0.04 gram of resulting styphnate per minute per square centimeter surface area of the reaction vessel, the surface of the reaction vessel being resistant to chemical attack, having a surface roughness of less than 0.025 micron and having a hardness of at least 5 MOH.

3. A method according to claim 2 wherein the contents of the reaction vessel and the chambers are continuously agitated by respective streams of gas.

4. A method according to claim 2 wherein said rate is such as to produce not more than 0.025 gram per minute per square centimeter.

5. A method of manufacturing lead styphnate comprising continuously flowing solutions of a trinitro resorcinate and a lead salt, into a reaction vessel at a rate such as to produce not more than 0.04 gram of resulting styphnate per minute per square centimeter surface area of the reaction vessel, the surface of the reaction vessel being resistant to chemical attack, having a surface roughness of less than 0.025 micron and having a hardness of at least 5 MOH, continuously agitating the contents of the reaction vessel by means of a stream of gas, flowing the contents of the reaction vessel through a plurality of chambers, connected in series, to an outlet, and within each chamber continuously agitating the contents of that chamber by means of a stream of gas, the reaction vessel and at least the adjacent one of said chambers being maintained at a temperature in the range 45°–70°C.

6. A method as claimed in claim 1 wherein each chamber communicates with the preceding chamber in the series, or in the case of the first chamber of the series with the reaction vessel, via communicating means opening into a lower portion of said preceding chamber or reaction vessel.

7. A method as claimed in claim 5 wherein each chamber communicates with the preceding chamber in the series, or in the case of the first chamber of the series with the reaction vessel, via communicating means opening into a lower portion of said preceding chamber or reaction vessel.

8. A method as claimed in claim 2 wherein a plurality of reaction vessels feeds a common series of chambers.

9. A method as claimed in claim 5 wherein a plurality of reaction vessels feeds a common series of chambers.

10. A method as claimed in claim 1 wherein the contents of the reaction vessel are flowed through at least three chambers to the outlet.

11. A method as claimed in claim 5 wherein the contents of the reaction vessel are flowed through at least three chambers to the outlet.

12. A method according to claim 1 wherein the contents of the reaction vessel and the chambers are continuously agitated by respective streams of gas.

13. A method according to claim 12 wherein said stream of gas are saturated with water vapour.

14. A method according to claim 1 wherein the reaction vesssel and at least one of the chambers adjacent thereto are maintained at a temperature of 45°–70°C.

15. A method according to claim 14 wherein said temperature is 60°–70°C.

16. A method according to claim 14 wherein the reaction vessel and said at least one of the chambers are maintained at the required temperature by a surrounding water bath.

17. A method according to claim 12 wherein the reaction vessel and said at least one of the chambers are maintained at the required temperature by heating of the gas streams providing agitation for the contents thereof.

18. A method according to claim 2 wherein the reaction vessel is formed of or lined with a glass.

19. A method according to claim 2 wherein the surface roughness is not greater than 0.0025 micron.

20. A method as in claim 18 wherein the glass is a boro-silicate glass.

* * * * *